US012737994B2

(12) United States Patent
Karos et al.

(10) Patent No.: US 12,737,994 B2
(45) Date of Patent: Sep. 15, 2026

(54) AUGMENTED REALITY OPTIMAL VIRTUAL ASSISTANCE

(71) Applicant: International Business Machines Corporation, Armonk, NY (US)

(72) Inventors: Beth Karos, Valencia, PA (US); Kelley Anders, East New Market, MD (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 18/336,084

(22) Filed: Jun. 16, 2023

(65) Prior Publication Data

US 2024/0420427 A1 Dec. 19, 2024

(51) Int. Cl.
*G06T 19/00* (2011.01)
*G06V 10/74* (2022.01)

(52) U.S. Cl.
CPC .......... *G06T 19/006* (2013.01); *G06V 10/761* (2022.01)

(58) Field of Classification Search
CPC ............................ G06T 19/006; G06V 10/761
See application file for complete search history.

(56) References Cited

U.S. PATENT DOCUMENTS 8,830,267 B2 * 9/2014 Brackney .................. G06F 3/14 345/632
9,779,571 B2 10/2017 Chong
9,919,704 B1 3/2018 Kundu
10,089,791 B2 * 10/2018 Mullins ................. G06T 19/006
10,282,634 B2 * 5/2019 Kozuka .................. G06V 20/58
10,452,956 B2 * 10/2019 Kwant ............... G06V 10/7788
10,571,145 B2 * 2/2020 Miyaura .................. F24F 11/30
10,739,861 B2 * 8/2020 Kin ........................ G06V 40/18
11,242,031 B2 2/2022 Han
11,277,882 B2 3/2022 Lewis
11,358,566 B2 6/2022 Kim
11,507,400 B2 * 11/2022 Srivastava ............. G06N 20/00
11,520,947 B1 * 12/2022 Serackis ................. G06F 9/451
11,544,922 B1 * 1/2023 Assam ................... G06V 20/20
11,707,663 B1 * 7/2023 Hall ................... A63B 71/0605 700/91

(Continued)

FOREIGN PATENT DOCUMENTS

KR 101427889 B1 8/2014
WO 2018091640 A3 5/2018

OTHER PUBLICATIONS

"Finding the force of friction of a moving object and its change when it accelerates to a constant speed", Stack Exchange, printed May 4, 2023, 6 pages, <https://physics.stackexchange.com/questions/56472/finding-the-force-of-friction-of-a-moving-object-and-its-change-when-it-accelera>.

(Continued)

*Primary Examiner* — Motilewa Good-Johnson
(74) *Attorney, Agent, or Firm* — Andre L. Adkins

(57) ABSTRACT

Techniques are described with respect to a system, method, and computer program product for visualizing optimal augmented reality (AR) assistance. An associated method includes receiving a plurality of object data of at least one object associated with a user; generating an optimal assistance model based on analysis of the plurality of object data; predicting a plurality of object metrics of the object based on the optimal assistance model; and visualizing the plurality of object metrics in a virtual environment associated the user.

20 Claims, 7 Drawing Sheets

410

(56) References Cited

U.S. PATENT DOCUMENTS

| | | | | |
|---|---|---|---|---|
| 12,008,451 | B1 * | 6/2024 | Agrawal | G06F 3/017 |
| 12,032,812 | B1 * | 7/2024 | Chavali | G06T 19/006 |
| 12,032,813 | B1 * | 7/2024 | Singhal | G06F 3/04842 |
| 12,283,003 | B2 * | 4/2025 | Althobaiti | H04N 21/2187 |
| 2008/0294314 | A1 | 11/2008 | Morris | |
| 2011/0295469 | A1 | 12/2011 | Rafii | |
| 2014/0002493 | A1 * | 1/2014 | Mitchell | A63F 13/00 345/633 |
| 2016/0049005 | A1 * | 2/2016 | Mullins | G06T 19/006 345/420 |
| 2017/0076603 | A1 | 3/2017 | Bostick | |
| 2017/0243083 | A1 * | 8/2017 | Wang | G06T 7/20 |
| 2018/0190020 | A1 * | 7/2018 | Mullins | G06N 7/01 |
| 2018/0218538 | A1 * | 8/2018 | Short | G06V 20/20 |
| 2019/0056779 | A1 * | 2/2019 | Guven | G06T 19/006 |
| 2019/0341149 | A1 * | 11/2019 | Chiu | A61M 5/1723 |
| 2020/0079310 | A1 | 3/2020 | Kline | |
| 2020/0211292 | A1 * | 7/2020 | Wu | G06T 19/006 |
| 2022/0198720 | A1 * | 6/2022 | Millette | G06T 7/70 |
| 2022/0259914 | A1 | 8/2022 | Tsukao | |
| 2022/0270509 | A1 * | 8/2022 | Josephson | G09B 5/065 |
| 2023/0326143 | A1 * | 10/2023 | Althobaiti | H04N 21/4312 |
| 2023/0405461 | A1 * | 12/2023 | Dorn | A63F 13/79 |
| 2024/0312144 | A1 * | 9/2024 | Perumalla | G06T 19/006 |
| 2024/0331311 | A1 * | 10/2024 | Sui | G06T 19/20 |
| 2025/0029387 | A1 * | 1/2025 | Hall | G06V 10/25 |
| 2025/0053019 | A1 * | 2/2025 | Al-Husseini | G01C 23/005 |

OTHER PUBLICATIONS

"Rotational Kinematics: 6.3 Rotational Motion", Open Stax, Printed May 4, 2023, 10 pages, <https://openstax.org/books/physics/pages/6-3-rotational-motion>.

"System and Method for Automobile and Bicycle Safety", An IP.com Prior Art Database Technical Disclosure, IP.com No. IPCOM000210925D, Sep. 16, 2011, 4 pages.

* cited by examiner

AUGMENTED REALITY OPTIMAL VIRTUAL ASSISTANCE

FIELD

This disclosure relates generally to virtual reality and augmented reality, and more particularly to computing systems, computer-implemented methods, and computer program products configured to provide augmented reality-based optimal virtual assistance in virtual environments.

Virtual models are designed to accurately reflect physical objects within virtual environments allowing augmented reality systems to depict sensory information seamlessly interwoven with the physical world such that it is perceived as an immersive aspect of the real environment surrounding a user. Conventionally, physical objects associated with the user in the real world (e.g., surrounding objects, etc.) inherently pose various possibilities, threats, risks, etc. to the objects themselves, the user, and other components of the surroundings. For example, a door of a vehicle parked on a public street being opened poses a risk to not only itself by possibly sustaining damage by coming into contact with another nearby object, but also its surroundings by becoming a danger to those passing by not paying attention. Through the use of augmented reality (AR) and artificial intelligence (AI), not only may characteristics of physical objects be visualized and presented to users within virtual environments, but also objects may be analyzed in order to automatically predict various factors associated with objects including but not limited to movement, impact, force, direction, and the like. Using the combination of AR and AI may not only increase the accuracy of determining physical characteristics of objects, but also provide AR users a more accurate and complete depiction of the risks a physical object poses to users based on various facets such as inherent nature, position, and the like.

SUMMARY

Additional aspects and/or advantages will be set forth in part in the description which follows and, in part, will be apparent from the description, or may be learned by practice of the invention.

Embodiments relate to a method, system, and computer program product for visualizing optimal augmented reality (AR) assistance. In some embodiments, the computer-implemented method comprises receiving a plurality of object data of at least one object associated with a user; generating an optimal assistance model based on analysis of the plurality of object data; predicting a plurality of object metrics of the object based on the optimal assistance model; and visualizing the plurality of object metrics in a virtual environment associated the user.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
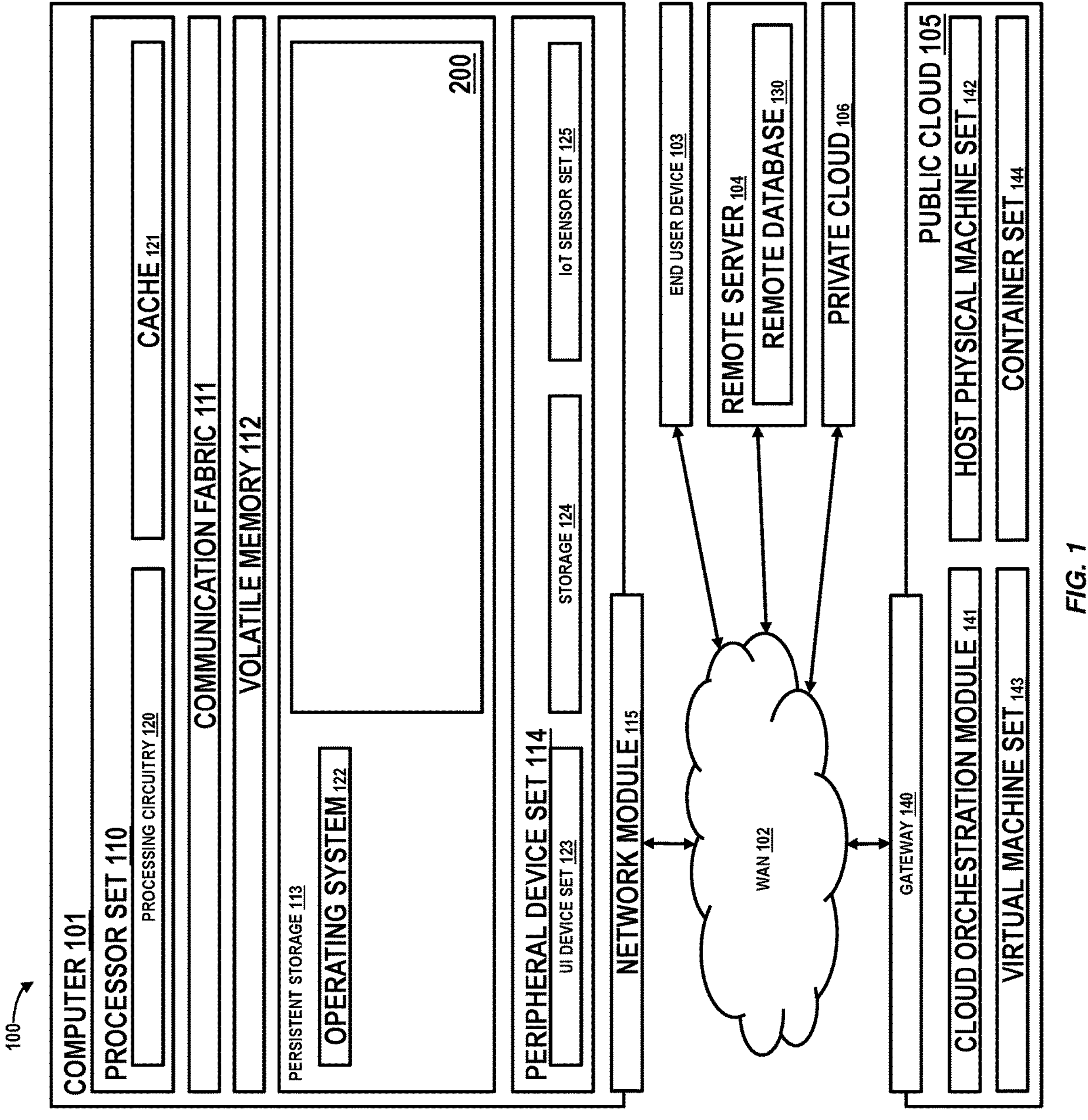
FIG. 1 illustrates a networked computer environment, according to an exemplary embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, and computer program product for visualizing optimal augmented reality assistance. Virtual reality, augmented reality, extended reality, mixed reality systems, etc. have become mechanisms for computer-generated content to be displayed to users in virtual environments based on analyses of surrounding physical environments. However, various objects and elements of the surrounding physical environments pose significant risks, threats, and the like due to the inherent nature of objects that users come across and/or within close proximity to while traversing physical spaces. For example, during a casual nature walk, an individual may come into contact with various static objects (e.g., trees, buildings, etc.) which may pose little to no threat to the individual, while contact with dynamic objects (e.g., animals, people, etc.) may pose significant danger to the individual. Furthermore, artificial intelligence provides one or more mechanisms that support not only the analysis of objects, but also the generation of predictions associated with objects based on various factors including, but not limited to, the inherent attributes of an object, historical information of the object, position/direction of the object, and physics-related characteristics (e.g., forces, impact, etc.), and the like. Thus, the present embodiments have the capacity to improve not only the quality of life for VR/AR users by providing real-time risk calculations pertaining to objects associated with the physical surroundings of users, but also the AR experience by providing visualizations of movements, forces, propensity levels, etc. associated with objects that allow users to view the possible movements, forces, propensity levels, etc. within virtual environments.

As described herein, augmented reality ("AR") is technology that enables enhancement of user perception of a real-world environment through superimposition of a digital overlay in a display interface providing a view of such environment. Augmented reality enables display of digital elements to highlight or otherwise annotate specific features of the physical world based upon data collection and analysis. For instance, augmented reality can provide respective visualizations of various layers of information relevant to displayed real-world scenes.

As described herein, virtual reality ("VR") refers to a computing environment configured to support computer-generated objects and computer mediated reality incorporating visual, auditory, and other forms of sensory feedback. It should be noted that a VR environment may be provided by any applicable computing device(s) configured to support a VR, augmented reality, extended reality, and/or mixed reality user interacting with their surroundings, said interactions including but not limited to user movement/gazing, manipulation of virtual and non-virtual objects, or any other applicable interactions between users and computing devices known to those of ordinary skill in the art.

As described herein, the term "object" encompasses any person, place, or thing configured to be encountered by an individual while traversing physical and/or virtual spaces. Objects may further encompass elements in various forms including but not limited to liquids, gases, chemicals, and the like configured to be identified by the appropriate detection mechanisms. For example, an object may encompass a chemical toxin presented in a collection of gas detected by the applicable computing device associated with the individual while traversing a physical space.

As described herein, the term "object data" encompasses applicable information associated with an object including, but not limited to sensor data, environmental data, impact data, and any other applicable data associated with the object. In some embodiments, object data may further comprise user attribute data derived from a user profile associated with a user, data pertaining to a user's previous and current interactions with the object and/or similar objects of that type, and the like.

As described herein, the term "object metric" encompasses one or more outputs of an optimal assistance model trained on training datasets including object data. However, the training datasets may include other various forms of data including but not limited to crowdsourced data, environmental data, social media-based data, and any other applicable internet-based data source known to those of ordinary skill in the art.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It is further understood that although this disclosure includes a detailed description on cloud-computing, implementation of the teachings recited herein are not limited to a cloud-computing environment. Rather, embodiments of the present invention are capable of being implemented in conjunction with any other type of computing environment now known or later developed.

The following described exemplary embodiments provide a system, method and computer program product for visualizing optimal augmented reality assistance. Referring now to FIG. 1, a computing environment 100 contains an example of an environment for the execution of at least some of the computer code involved in performing the inventive methods, such as system 200. In addition to system 200, computing environment 100 contains an example of an environment for the execution of at least some of the computer code involved in performing the inventive methods. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, computer-mediated reality device (e.g., AR/VR headsets, AR/VR goggles, AR/VR glasses, etc.), mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) payment device), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD payment device. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter payment device or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
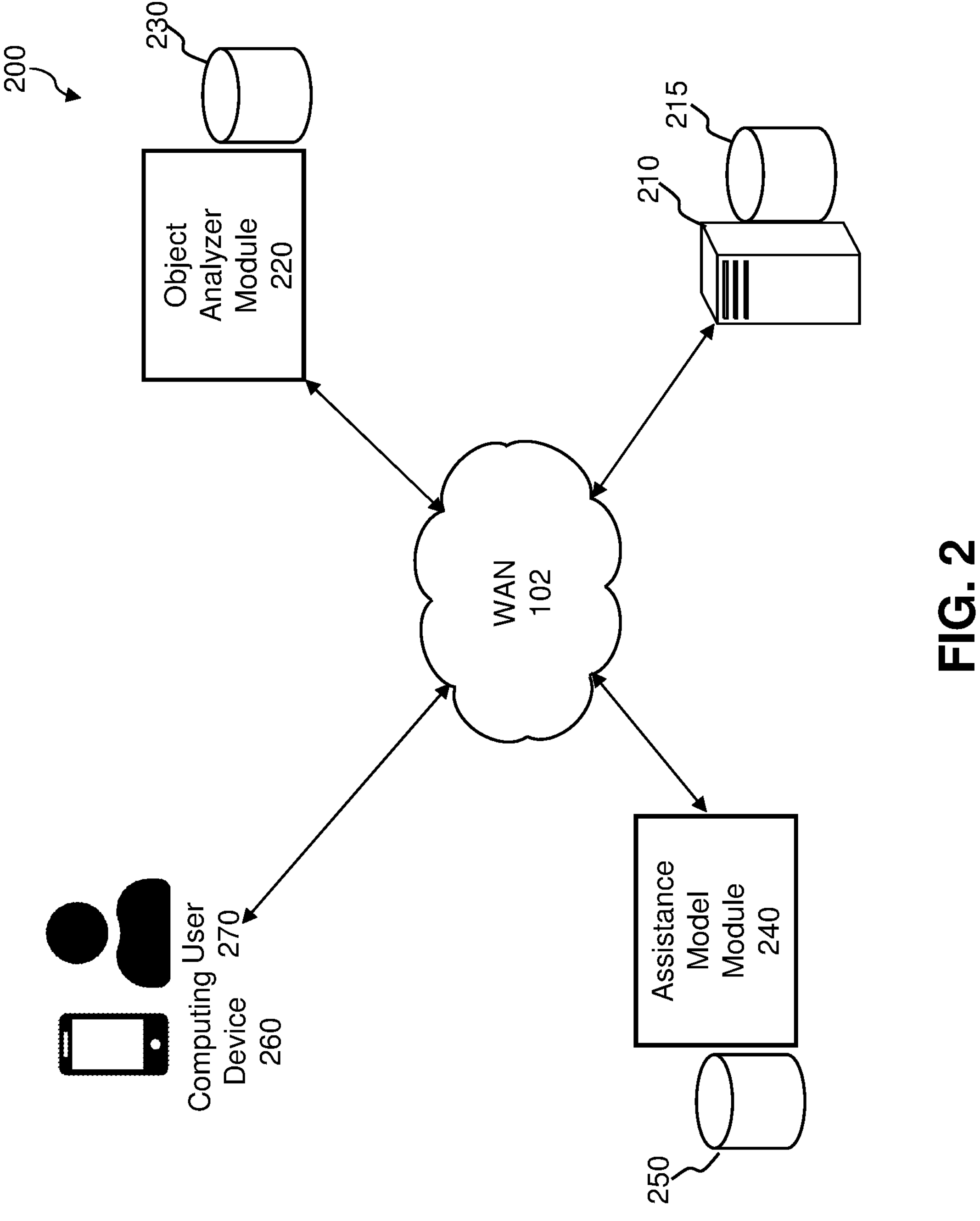
FIG. 2 illustrates an optimal augmented reality assistance system environment, according to an exemplary embodiment.

Referring now to FIG. 2, a functional block diagram of a networked computer environment illustrating a computing environment for an optimal augmented reality assistance system 200 (hereinafter "system") comprising a server 210 communicatively coupled to a database 215, an object analyzer module 220, an object analyzer database 230, an assistance model module 240, an assistance model database 250, and a computing device 260 associated with a user 270, each of which are communicatively coupled over WAN 102 (hereinafter "network") and data from the components of system 200 transmitted across the network is stored in database 215. In some embodiments, server 210 is configured to operate a centralized platform serving as a cloud-based object analyzer and optimal assistance platform within virtual/augmented reality environments. Server 210 is configured to provide a mechanism for user 270 to provide user inputs and establish preferences, privacy settings, and the like via accessing one or more user interfaces and application programming interfaces (APIs) provided to computing device 260. The centralized platform further allows user 270 to designate priorities associated with the types of objects that object analyzer module 220 is to detect, analyze, ascertain object metrics, and report to user 270. For example, user 270 may designate a preference for static objects detected and analyzed by object analyzer module 220 to not be reported due to an assumed likelihood of low propensity associated with the detected object. The centralized platform also allows user 270 to determine the timing and manner in which object metrics are visualized within the virtual environment. For example, user 270 may designate that a vehicle door being opened, which is detected by object analyzer module 220 instantly, have the object metrics (e.g., characteristics, impact/force, threat probability, etc.) overlayed on the vehicle door as the vehicle door is being opened within a predetermined distance threshold from user 270. It should be noted that the presentation of the visualization of the object metrics may be depicted in various shapes, colors, shadings, effects (e.g., flashing, strobing, embedded into virtual objects, etc.), within push notifications, and the like.

Object analyzer module 220 is configured to detect and analyze objects within the physical surroundings of user 270 via the applicable sensors associated with computing device 260 (attached to and/or communicatively coupled). Object analyzer module 220 is designed to support one or more artificial intelligence-based techniques such as object detection/identification, object tracking, computer vision (associated with monitoring system if applicable), fuzzy segmenting, reinforcement learning, and any other applicable object identification techniques known to those of ordinary skill in the art. Object analyzer module 220 is further tasked with generating and maintaining object profiles associated with the detected objects that are configured to serve as collections of object characteristics/attributes (e.g., weight, size, range of movement, level of propensity, etc.), object historical information (e.g., previous locations where object was detected, user previous interactions with same or similar objects, etc.), data pertaining to the object derived from applicable internet-based sources via web crawlers associated with server 210, and the like. The object profiles are designed to be stored and maintained on object analyzer database 230, in which the object profiles are continuously updated as object analyzer module 220 processed object data.

Assistance model module 240 is designed to not only perform mapping of the detected objects to the virtual environment, but also to generate and visualize object metrics pertaining to the objects based on an optimal assistance model maintained by assistance model module 240. In addition, assistance model module 240 ascertains the context of a virtual environment user 270 is within and generates a user profile associated with user 270. The user profile is designed to function as centralized entity of data associated with user 270 including, but not limited to, user preferences, biological data (e.g., strength, muscle mass, medical conditions, size, weight, etc.), activity data (e.g., level of engagement with detected object, etc.), social media-based data, user analytics, and any other applicable user data known to those of ordinary skill of the art. The user profiles are designed to be stored and maintained on assistance model database 250. Furthermore, assistance model module 240 is configured to generate one or more machine learning models designed to generate outputs serving as predictions associated with detected objects known as object metrics. The object metrics are configured to be utilized by the optimal assistance model in order to present the object metrics to user 270 within the applicable virtual environment. In some embodiments, object metrics are generated based on one or more of object profiles, user profiles, environmental data, contextual information associated with the virtual environment, and the like. Object metrics are also stored in assistance model database 250 in which reinforcement learning may be utilized with the object metrics in order to increase accuracy and precision of utilization of the object metrics within the virtual environment.

Figure 3:
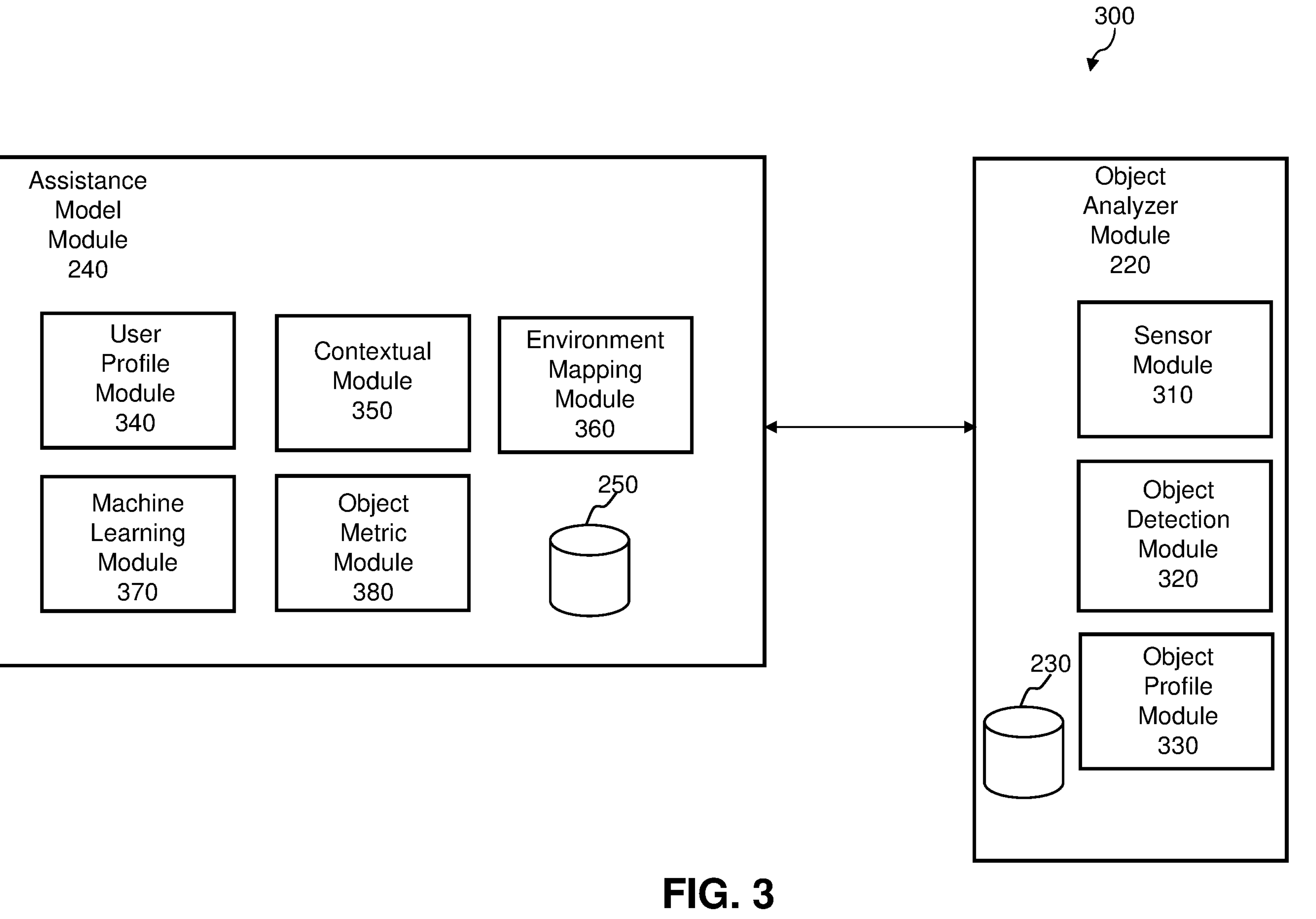
FIG. 3 illustrates a block diagram of various modules associated with the optimal augmented reality assistance system of FIG. 2, according to an exemplary embodiment.

Referring now to FIG. 3, an example architecture 300 of object analyzer module 220 and an assistance model module 240 is depicted, according to an exemplary embodiment. In some embodiments, object analyzer module 220 comprises a sensor module 310, an object detection module 320, and an object profile module 330. Assistance model module 240 comprises a user profile module 340, a contextual module 350, an environment mapping module 360, a machine learning module 370, and an object metric module 380. It should be noted that object analyzer module 220 and assistance model module 240 are communicatively coupled over the network allowing for outputs and/or analyses performed by each respective module and their sub-modules to be utilized in applicable training datasets to be utilized by applicable machine learning models operated by machine learning module 370 and/or applicable cognitive systems associated with system 200. Sensor module 310 is a collection of one or more sensor systems associated with the facility and its resources in which sensors of the sensor systems may include, but are not limited to, cameras, microphones, position sensors, gyroscopes, accelerometers, pressure sensors, cameras, microphones, temperature sensors, biological-based sensors (e.g., heartrate, biometric signals, etc.), a bar code scanner, an RFID scanner, an infrared camera, a forward-looking infrared (FLIR) camera for heat detection, a time-of-flight camera for measuring distance, a radar sensor, a LiDAR sensor, a temperature sensor, a humidity sensor, a motion sensor, IoT sensors, or any other applicable type of sensors known to those of ordinary skill in the art. The sensors may be installed in computing device 260 and/or other applicable computing devices (e.g., monitoring systems, CCTV systems, computer visioning systems, etc.). In some embodiments, the aforementioned biological data associated with user 270 may be collected by computing device 260 in which biological data may include heartrate, blood pressure, facial movements (e.g., facial expressions), body movements, eye movements/gaze tracking, and the like. Sensor module 310 may also account for collecting environmental data (e.g., weather, temperature, air quality levels, object location, object proximity, wind speed, etc.) associated with the physical environment surrounding user 270. The environmental data is important for the purpose of determining the levels of propensity associated with objects identified by object detection module 220. For example, a vehicle moving in a particular direction may be in close proximity to user 270 in which its level of propensity in regards to user 270 may be determined and/or impacted by one or more factors ascertained from the environmental data (e.g., object visibility impacted by the weather, change of object state relative to proximity to user 270, etc.).

Object detection module 320 is tasked with identifying objects in both the physical and virtual surroundings of user 270. Object detection module 320 is configured to identify objects utilizing various techniques including, but not limited to, classification (e.g., training classifiers), segmentation, image analysis, frame-by-frame analysis, feature mapping using filtration via neural network processing, region of interest identification, and any other applicable type of object identification mechanisms known to those of ordinary skill of the art. In some embodiments, object detection module 320 facilitates highlighting of objects visualized within the applicable virtual environment by communicating with machine learning module 370 in order to train one or more machine learned models to output an indication (e.g., highlighting, bounding, flashing, etc.) to a detected objected. For example, object detection module 320 may detect a wild animal within the perspective of user 270 in which object detection module 320 highlights the wild animal within the visualization of the virtual environment portrayed to user 270.

Object profile module 330 is configured to generate an object profile for each of the objects identified by object detection module 320. The object profile is configured to include historical information associated with the object, object characteristics (e.g., size, weight, range of movements, etc.), limitations associated with the object, and the like. In some embodiments, generation of the user profile is based on object detection module 320 performing one or more analyses on the object resulting in object data not received from sensor module 310 to be ascertained. For example, in the instance where sensor module 310 may ascertain the visuals and location associated with the wild animal, object detection module 320 may communicate with machine learning module 370 in which one or more of the machine learning models may determine the size, weight, range of movement, and the like associated with the wild animal, in which the ascertain data is included in the object profile stored and maintained on object analyzer database 230. One of the purposes of the object profiles is to serve as a source for training datasets when the one or more machine learning models are producing object metrics. In addition, object profiles are further designed to include impact data (i.e., the level of force applied by the detected object) and derivatives thereof associated with a detected object. For example, the duration of impact may help identify how great of an effect the impact will have on the surrounding area itself, objects in the surrounding area, and/or user 270. A high force applied over a short time period may have a high effect and a high force applied over a long time period may have an even higher effect. However, a lower force applied over a longer period of time, even though the duration of the impact may be longer, may have a lower effect on the surrounding area. As described herein, "force" may be associated with gravitational forces, friction forces, electromagnetic forces, electric forces, chemical forces, rotational forces, and the like. In some embodiments, the level of impact is determined based on one or more of the location of user 270, duration of the force, environmental data, gravitational forces, friction forces, electromagnetic forces, electric forces, chemical forces, biological data, and the like. In some embodiments, force data may be determined based on the object data and/or other objects ascertained from the object data (e.g., a second object coming into contact with a first object, a car accident, etc.).

User profile module 340 is configured to generate user profiles associated with user 270 and other applicable users in the virtual environments. User profiles may include, but not limited to, user preferences, biological data (e.g., physical features, cultural-based data, height, weight, etc.) user behavior data, user interaction data relative to objects, user internet browsing-based data, social media-based data, learning profile data, and any other applicable user data known to those of ordinary skill in the art. In some embodiments, server 210 is continuously soliciting user data from user 270 via the centralized platform in which preferences, dislikes, and other applicable analytics associated with user 270 are ascertained based upon activities and interactions of user 270 with elements of virtual environments. For example, interactions of user 270 with targeted content (e.g., advertisements, virtual objects, etc.) presented to user 270 within the virtual environment allows user profile module 340 to determine topics, manners of content presentation, types of virtual content, etc. that user 270 prefers to engage with and stores the ascertained information into the user profile.

Contextual module 350 is designed to determine the context of one or more interactions/prospective interactions between user 270 and a detected object or a virtual environment In some embodiments, the context may be established by one or more of the virtual environment elements (e.g., setting, theme, virtual objects, etc.), dialogue among users and participating virtual elements (e.g., chatbots, instructions, etc.) within the virtual environment, transactions within the virtual environment, workflows occurring within the virtual environment, and the like. In some embodiments, various interactions between user 270 and the detected object allow the context to be ascertained. For example, in the instance where user 270 is in the proximity of a wild animal and upon detection and highlight of the wild animal by object detection module 320 user 270 stops moving, contextual module 350 is configured to determine that user 270 has stopped traversing the physical area in order to avoid interaction with the wild animal.

Environment mapping module 360 is tasked with performing of mapping of the virtual environment based on the analysis of the physical surroundings of user 270. In some embodiments, environment mapping module 360 maps the detected objects identified by object detection module 320 to the virtual environment generated by the applicable AR system based on the physical surroundings of user 270, in which the mapping is generally a framework and bounds for visually representing the data of the optimal assistance model as a result of applying and probing the model. Various mapping techniques may be applied by environment mapping module 360 such as, but not limited to, direct mapping in which object metrics are superimposed along prospective paths within conventional space. This feature allows object metrics such as predicted movements/motion associated with a detected object to be visualized within the virtual environment. Visualization of object metrics within environments mapped by environment mapping module 360 allows automated predictions of potential consequences, risks, etc. associated with detected objects within the physical surroundings of user 270, in which continuous learning and training constantly improve the algorithms and calculations performed by both object analyzer module 220 and assistance model module 240. In addition, this allows for user 270 to ascertain various potential consequences, such as but not limited to the range of movement, amount of force, level of propensity, and any other applicable output of optimal assistance model configured to function as an object metric. Thus, said potential consequences may be minimized or even eliminated, potentially preventing damages in the surrounding area and potential harm to user 270.

Machine learning module 370 is configured to use one or more heuristics and/or machine learning models for performing one or more of the various aspects as described herein (including, in various embodiments, the natural language processing or image analysis discussed herein). In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure. For example, machine learning module 370 is designed to maintain one or more machine learning models dealing with training datasets including data derived from the contextual information, biological data associated with user 270, object data of identified objects, environmental data, and the like in order to generate predictions pertaining to object metrics associated with identified objects. The optimal assistance model furthermore predicts one or more contextual situations based on the contextual information, object data, object metrics, environmental data, and/or biological data. As a result, the optimal assistance model is designed to generate predictions that provide real-time assistance to user 270 in the virtual environment (e.g., visualization of object data, object metrics, and the like) to avoid potential consequences associated with identified objects in the surrounding physical world. For example, if an identified object is positioned and oriented in a particular manner ascertained from analyses of the object data and/or environmental data, then the optimal assistance model may predict the range of movements based on the forces acting on it, in which the virtual environment visualizes a simulation of the forces acting on the identified object.

Object metric module 380 is tasked with maintaining and visualizing object metrics derived from the outputs of the one or more machine learning models and optimal assistance model. As previously described, training datasets associated with the aforementioned models may be derived from object data, crowdsourced data, environmental data, social media-based data, and any other applicable internet-based data source known to those of ordinary skill in the art, in which object metrics are stored in assistance model database 250. However, object metrics may include, but are not limited to, weight, size, force data, state of the object (e.g., resting, active, etc.), range of movement, level of visibility, and the like. In some embodiments, object metrics may be based upon analyses of object data in which object data may include, but is not limited to, size, weight, shape/dimension, type of contents, viscosity, orientation, and any other applicable type of object characteristic-related data known to those of ordinary skill in the art. Object metrics and/or object data may be overlayed in the generated visualizations allowing user 270 view information associated with the object within the virtual environment. The overlaying of the object metrics may be initiated based on a gaze detection associated with user 270 aligned with the direction of the detected object. In some embodiments, object metric module 380 utilizes one or more object metrics to calculate a degree of assistance associated with the object required for the user 270. For example, upon user 270 directing their gaze upon the detected object (e.g., a kettlebell), object detection module 320 instructs object profile module 330 to generate an object profile for the detected object and the analyses performed by assistance model module 240 allows object metric module 380 to calculate the degree of assistance, which may include but is not limited to the amount of force required by user 270 to move the kettlebell.

Figure 4:
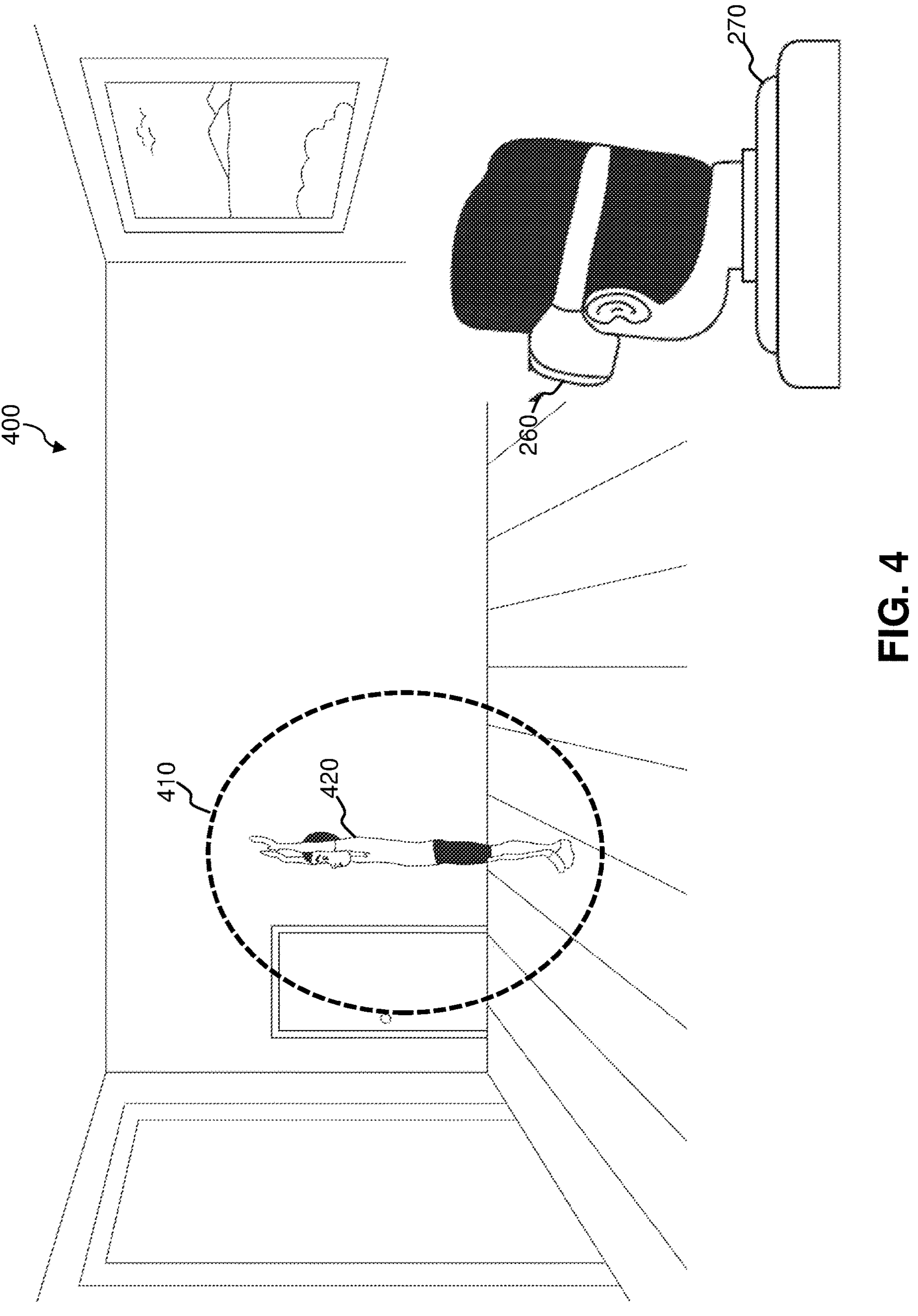
FIG. 4 illustrates a schematic diagram showing a detected object associated with a user viewing their surrounding environment, as viewed through a computer-mediated reality device, according to an exemplary embodiment.

Referring now to FIG. 4, a surrounding physical environment 400 associated with user 270 is depicted within a virtual environment, according to an exemplary embodiment. The components of system 200 are further discussed herein in reference to environment 400, in which object detection module 320 generates a detection indicator 410 upon object detection module 320 detecting an object 420 within the perspective of user 270 via computing device 260. It should be noted that detection indicator 410 may be visualized in the virtual environment via highlighting, flashing, strobing, transparency, or any other applicable identification-based mechanism known to those of ordinary skill in the art. Object detection module 320 communicates with sensor module 310 in order to generate a 3D mapping of environment 400 allowing object detection module 320 to identify object 420. Upon detection of object 420, object detection module 320 analyzes object 420 by utilizing various techniques (e.g., LIDAR, 3D point clouds, computer visioning, etc.) resulting in object detection module 320 ascertaining object data (e.g., size, shape, orientation, etc.)

of object 420 in addition to server 210 collecting applicable data associated with object 420 (e.g., crowdsourced data, social media-based data, historical information, and the like). As a result, object profile module 330 generates an object profile associated with object 420 configured to be utilized by assistance model module 240. In some embodiments, machine learning module 370 may use historical information associated with user 270, environment 400, and/or object 420 to learn/train the one or more machine learning models when predicting contextual situations associated with user 270. The optimal assistance model may then utilize the contextual situations along with the object metrics to visualize potential consequences associated with object 420 based on one or more of the biological data of user 270, environmental data, object data, etc. For example, in the instance in which object 420 is a piece of machinery/equipment, the one or more machine learning models may predict that an environmental factor such as wind has the capability of making object 420 swing in the vicinity of user 270, therefore, making object 420 a potential hazard comprising an object metric of a particular of amount force. As a result, the optimal assistance model generates visualizations of movements of object 420 along with potential damages as a result of the movements which are depicted to user 270 in the virtual environment via computing device 260. For example, the optimal assistance model may generate visualizations of the degree of assistance associated with user 270 interacting with object 420.

Figure 5:
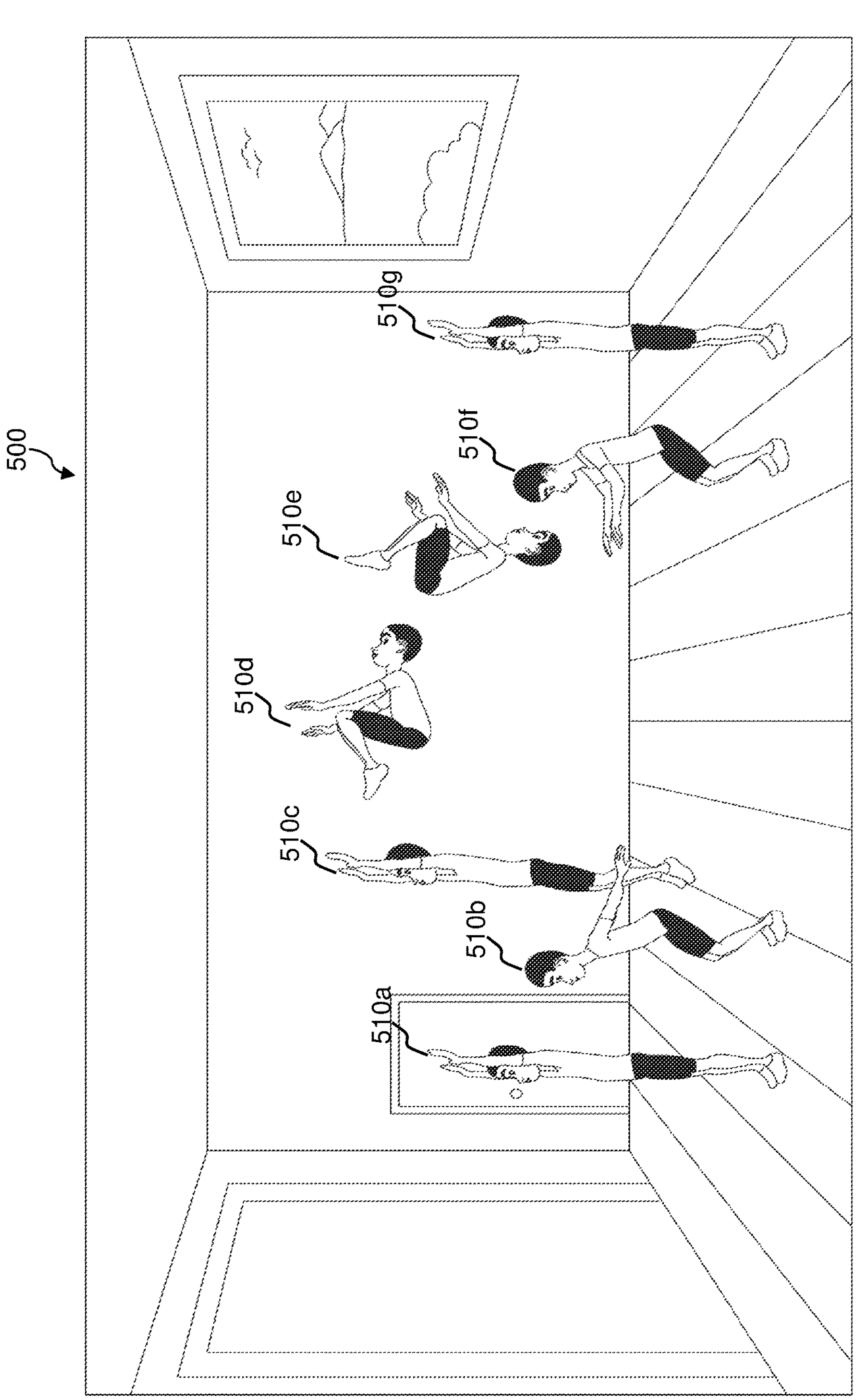
FIG. 5 illustrates a schematic diagram showing a first augmented reality experience of a user viewing an optimized assistance based on their surrounding environment, as viewed through the computer-mediated reality device, according to an exemplary embodiment.

Referring now to FIG. 5, a first visualization 500 of optimized assistance for user 270 with an object is depicted, according to an exemplary embodiment. In this example, user 270 viewing the virtual environment detects the object (e.g., a human) about to initiate predicted movements 510*a-g* in the for of a backflip motion. In some embodiments, predicted movements 510*a-g* are generated and visualized based upon one or more of the applicable object profile, the user profile associated with user 270, the location of user 270, contextual information, environmental data, and the like. In particular, predicted movements 510*a-g* allow user 270 to gauge distance from the object in order to prevent likely harm that may be caused to user 270 by coming into contact with the object. However, contextual information may be utilized in this instance to ascertain that the object is performing predicted movements 510*a-g* within a close proximity to user 270; thus, user 270 can view not only predicted movements 510*a-g* but also object metrics and/or object data associated with the object being overlayed on the object within the virtual environment in real-time.

Figure 6:
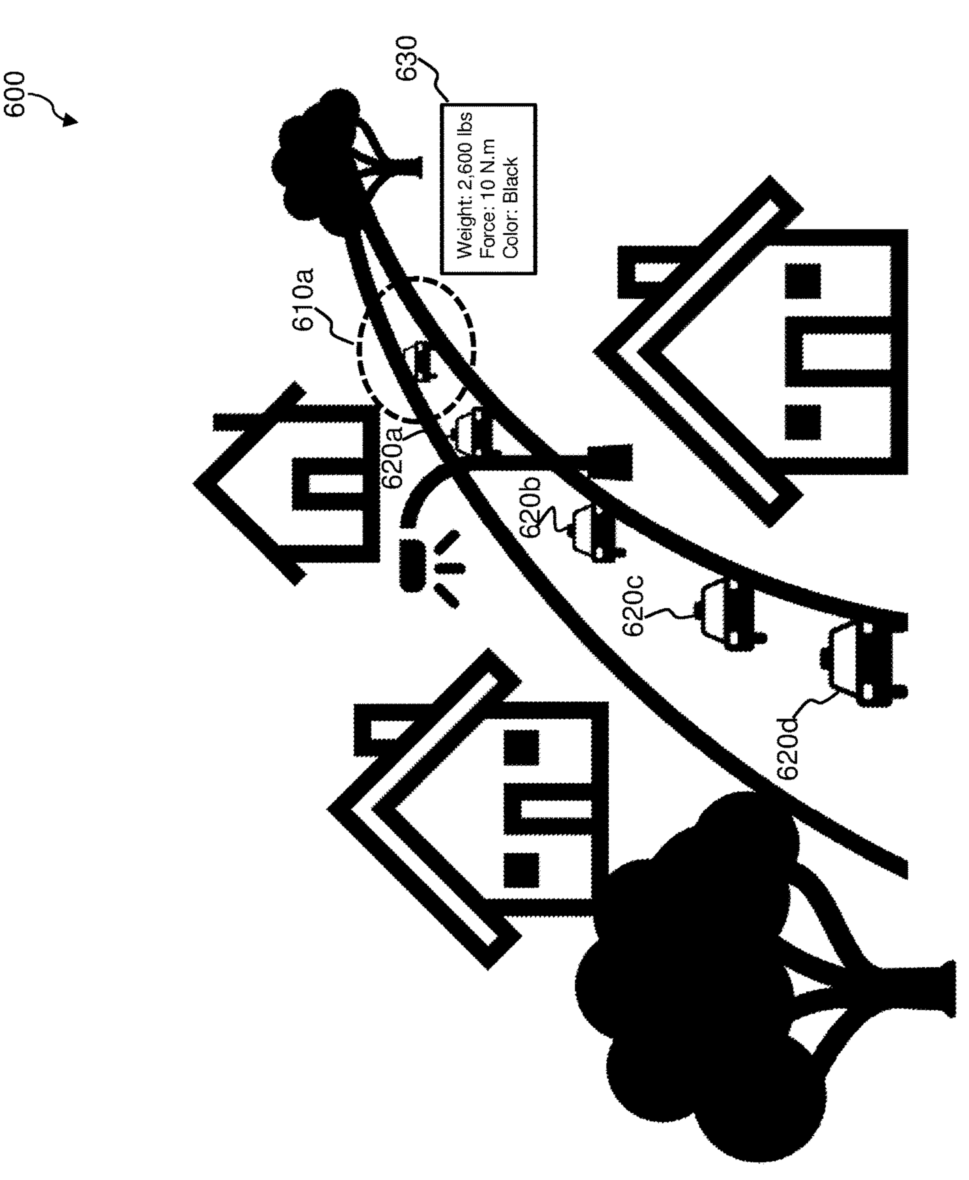
FIG. 6 illustrates a schematic diagram showing a second augmented reality experience of a user viewing an optimized assistance based on their surrounding environment, as viewed through the computer-mediated reality device, according to an exemplary embodiment.

Referring now to FIG. 6, a second visualization 600 of optimized assistance for user 270 with an object is depicted, according to an exemplary embodiment. In this example, user 270 viewing the virtual environment results in vehicle 610 being detected by object detection module 320 resulting in object profile module 330 rendering an object profile for vehicle 610, contributing generated object metrics 630 predicted by object metric module 380 to the object profile, and assistance model module 240 visualizing predicted movements 620*a-d* along with object metrics 630. It should be noted that the object metrics may be generated for various components of vehicle 610 including, but not limited to, factors associated with one or more doors of vehicle 610 (e.g., size, weight, movements, force, etc.), direction, velocity, and the like. For example, the object profile may comprise historical information of vehicle 610 indicating that the doors require a minimum amount of force to close, the amount time required for vehicle 610 to cover a certain amount of distance, or that a certain amount of time is required for vehicle 610 to come to a full stop. For example, the amount of distance covered for predicted movements 620*a-d* may be based on an analysis of historical information comprising average speed of vehicle 610, historic environment conditions, and the like. Object metrics 630 may account for the object data, historical information, previous object metrics, environmental data, biological data associated with user 270, location specific data/crowdsourcing data, and the like. For example, if the biological data indicates that user 270 has one or more physical limitations and a door of vehicle 610 requires a certain amount of force to close, then the optimal assistance model may predict that user 270 may not have the capacity to close the door. It should be noted that contextual solutions and associated consequences may be generated and visualized via the optimal assistance model, in which the aforementioned may simulated via based on potential threats, effects, etc. specific to the surrounding area and/or specific objects detected in the physical environment.

Figure 7:
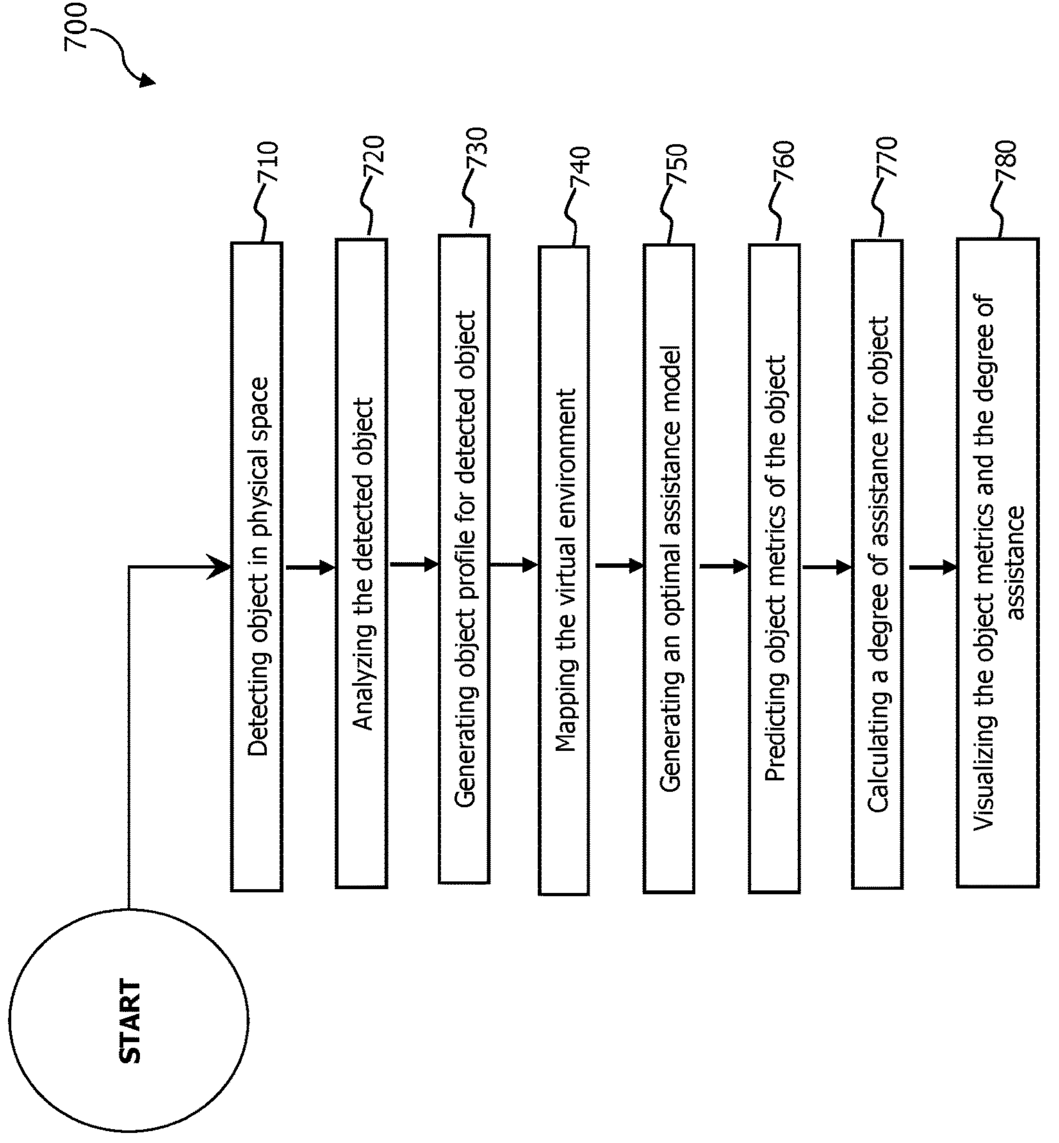
FIG. 7 illustrates an exemplary flowchart depicting a method for visualizing optimal augmented reality assistance, according to an exemplary embodiment.

With the foregoing overview of the example architecture, it may be helpful now to consider a high-level discussion of an example process. FIG. 7 depicts a flowchart illustrating a computer-implemented process 700 for visualizing optimal augmented reality assistance, consistent with an illustrative embodiment. Process 700 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 710 of process 700, object detection module 320 detects objects within the physical space associated with user 270 donning computing device 260. Object detection module 320 may utilize object detection/identification, object tracking, computer vision (associated with monitoring system if applicable), fuzzy segmenting, reinforcement learning, and any other applicable object identification techniques known to those of ordinary skill in the art.

At step 720 of process 700, sensor module 310 analyzes the objects detected by object detection module 320. Analysis may be performed by one or more of LIDAR, 3D point clouds, computer visioning, crowd-sourcing, classification/localization via Convolutional Neural Network, image/video analysis, You Only Look Once (YOLO) algorithm, or any other applicable object analysis techniques known to those of ordinary skill in the art. In some embodiments, the one or more machine learning models operated by machine learning module 370 are designed to perform reinforcement learning in order to optimize analyses performed on the detected objects. It should be noted that object data associated with detected objects is continuously received by sensor module 310 in real-time in which the object data may include, but is not limited to, size, weight, shape/dimension, type of contents, viscosity, orientation, force, and any other applicable type of object characteristic-related data known to those of ordinary skill in the art.

At step 730 of process 700, object profile module 330 generates the object profile associated with the detected object. The object profile is a derivative of the analyses performed on the detect object in which object data and ascertained object metrics are stored in the object profile. In some embodiments, the object profile further comprises historical information associated with the object. For example, if an object has a historical association with a propensity of danger (e.g., heavy machinery) then that may be accounted for in the object profile in addition to the analyses of the object in order to ascertain contextual information.

At step 740 of process 700, environment mapping module 360 performs mapping of the virtual environment derived from the physical surroundings of user 270. Various mapping techniques may be applied by environment mapping module 360 such as, but not limited to, direct mapping in which object metrics are superimposed along prospective paths within conventional space. This feature allows object metrics such as predicted movements/motion associated with a detected object to be visualized within the virtual environment. Visualization of object metrics within environments mapped by environment mapping module 360 allows automated predictions of potential consequences, risks, etc. associated with detected objects within the physical surroundings of user 270.

At step 750 of process 700, assistance model module 240 generates the optimal assistance model. Optimal assistance model may be associated with and/or derived from the one or more machine learning models operated by machine learning module 370. The optimal assistance model generates object metrics and visualizes object metrics pertaining to the objects based on analyses performed on one or more of object data, environmental data, object profiles, user profiles, contextual information, and the like. Visualizations produced by assistance model module 240 allow for user 270 to ascertain various potential consequences, such as but not limited to the range of movement, amount of force, level of propensity, and any other applicable predictions derived from outputs of the optimal assistance model configured to function as an object metric. Therefore, said potential consequences may be minimized or even eliminated, potentially preventing damages in the surrounding area and potential harm to user 270.

At step 760 of process 700, the optimal assistance model predicts object metrics of the detected objects. In some embodiments, the predictions are based on one or more of object profiles, user profiles, environmental data, contextual information, and the like. As previously mentioned, the optimal assistance model may not only visualize object metrics of detected objects within the physical surroundings of user 270, but also predict and visualize contextual situations in the virtual environment that could result due to the potential consequences, risks, etc. associated with the detected objects. In some embodiments, contextual situations are test cases configured to be visualized within the applicable virtual/augmented reality system, in which the machine learning module 370 may be utilized to predict test cases and reinforcement learning analyzes the predictions and optimizes them based on one or more of object profiles, user profiles, environmental data, contextual information, and the like.

At step 770 of process 700, object metric module 380 calculates a degree of assistance associated with the object required for user 270. In some embodiments, the degree of assistance may reflect the amount of time, energy, force, distance, etc. that is required of user 270 in order to interact with the detected object and/or avoid interaction with the detected object. The degree of assistance may be a numerical value configured to be overlayed on the detected object within the virtual environment presented to user 270 via computing device 260. The degree of assistance may be subject to various factors associated with user 270, such as but not limited to biological data, level of activity, size, height, preference, location, and any other applicable user-specific data known to those of ordinary skill in the art.

At step 780 of process 700, assistance model module 240 presents visualizations of the object metrics and the degree of assistance. In some embodiments, the visualizations are configured to be overlayed on the virtual environment allowing user 270 to not only view the object metrics associated with the detected objects, but also the predicted movements, object data, historical information, degree of assistance, etc. integrated into the virtual environment in real-time.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for visualizing optimal augmented reality (AR) assistance, the method comprising:

receiving, by a computing device, a plurality of object data of at least one object associated with a user;

generating, by the computing device, an optimal assistance model based on analysis of the plurality of object data;

predicting, by the computing device, a plurality of object metrics of the at least one object based on a plurality of contextual information derived from the optimal assistance model;

mapping, by the computing device, the plurality of object metrics to the at least one object in a virtual environment; and visualizing, by the computing device, a plurality of predictions derived from the plurality of object metrics in the virtual environment based on the mapping;

wherein the optimal assistance model calculates a degree of assistance and overlays the degree of assistance on the at least one object and a simulation comprising a plurality of predicted movements associated with the at least one object based on the plurality of contextual information;

wherein the simulation further comprises one or more visualizations of a potential consequence of a predicted movement of the plurality of predicted movements derived from the plurality of predictions.

2. The computer-implemented method of claim 1, wherein the plurality of object data comprises one or more of sensor data, environmental data, impact data, and user attribute data.

3. The computer-implemented method of claim 1, wherein predicting the plurality of object metrics comprises:

calculating, by the computing device, a predetermined distance from a location associated with the user; and determining, by the computing device, a level of impact of the at least one object interacting with the user within the predetermined distance.

4. The computer-implemented method of claim 1, wherein receiving the plurality of object data comprises:

analyzing, by the computing device, the at least one object; and generating, by the computing device, an object profile associated with the at least one object based on the analysis, wherein the object profile comprises historical information associated with the at least one object.

5. The computer-implemented method of claim 1, wherein predicting the plurality of object metrics comprises:

utilizing, by the computing device, the optimal assistance model to calculate the degree of assistance associated with the at least one object required for the user.

6. The computer-implemented method of claim 5, wherein visualizing the plurality of object metrics comprises:

overlaying, by the computing device, the degree of assistance and the plurality of object metrics within the virtual environment for presentation to the user within an augmented reality experience based on a gaze detection aligning with a direction of the at least one object.

7. The computer-implemented method of claim 3, wherein the level of impact is based on one or more of environmental data, gravitational forces, friction forces, electromagnetic forces, electric forces, chemical forces, rotational forces, and biological data.

8. A computer program product for visualizing optimal augmented reality (AR) assistance, the computer program product comprising or more computer readable storage media and program instructions collectively stored on the one or more computer readable storage media, the stored program instructions comprising:

program instructions to receive a plurality of object data of at least one object associated with a user;

program instructions to generate an optimal assistance model based on analysis of the plurality of object data;

program instructions to predict a plurality of object metrics of the at least one object based a plurality of contextual information derived from the optimal assistance model;

program instructions to map the plurality of object metrics to the at least one object in a virtual environment; and program instructions to visualize a plurality of predictions derived from the plurality of object metrics in the virtual environment based on the mapping;

wherein the optimal assistance model calculates a degree of assistance and overlays the degree of assistance on the at least one object and a simulation comprising a plurality of predicted movements associated with the at least one object based on the plurality of contextual information;

wherein the simulation further comprises one or more visualizations of a potential consequence of a predicted movement of the plurality of predicted movements derived from the plurality of predictions.

9. The computer program product of claim 8, wherein the program instructions to predict the plurality of object metrics further comprise:

program instructions to calculate a predetermined distance from a location associated with the user; and program instructions to determine a level of impact of the at least one object interacting with the user within the predetermined distance.

10. The computer program product of claim 8, wherein the program instructions to receive the plurality of object data further comprise:

program instructions to; analyze the at least one object; and program instructions to generate an object profile associated with the at least one object based on the analysis, wherein the object profile comprises historical information associated with the at least one object.

11. The computer program product of claim 8, wherein the program instructions to predict the plurality of object metrics further comprise:

program instructions to utilize the optimal assistance model to calculate the degree of assistance associated with the at least one object required for the user.

12. The computer program product of claim 11, wherein the program instructions to visualize the plurality of object metrics further comprise:

program instructions to overlay the degree of assistance and the plurality of object metrics within the virtual environment for presentation to the user within an augmented reality experience based on a gaze detection aligning with a direction of the at least one object.

13. The computer program product of claim 9, wherein the level of impact is based on one or more of environmental data, gravitational forces, friction forces, electromagnetic forces, electric forces, chemical forces, rotational forces, and biological data.

14. A computer system for visualizing optimal augmented reality (AR) assistance, the computer system comprising:

one or more processors;

one or more computer-readable memories;

program instructions stored on at least one of the one or more computer-readable memories for execution by at least one of the one or more processors, the program instructions comprising:

program instructions to receive a plurality of object data of at least one object associated with a user;

program instructions to generate an optimal assistance model based on analysis of the plurality of object data;

program instructions to predict a plurality of object metrics of the at least one object based on a plurality of contextual information derived from the optimal assistance model;

program instructions to map the plurality of object metrics to the at least one object in a virtual environment; and program instructions to visualize a plurality of predictions derived from the plurality of object metrics in the virtual environment based on the mapping;

wherein the optimal assistance model calculates a degree of assistance and overlays the degree of assistance on the at least one object and a simulation comprising a plurality of predicted movements associated with the at least one object based on the plurality of contextual information;

wherein the simulation further comprises one or more visualizations of a potential consequence of a predicted movement of the plurality of predicted movements derived from the plurality of predictions.

15. The computer system of claim 14, wherein the plurality of object data comprises one or more of sensor data, environmental data, impact data, and user attribute data.

16. The computer system of claim 14, wherein the program instructions to predict the plurality of object metrics further comprise:

program instructions to calculate a predetermined distance from a location associated with the user; and program instructions to determine a level of impact of the at least one object interacting with the user within the predetermined distance.

17. The computer system of claim 14, wherein the program instructions to receive the plurality of object data further comprise:

program instructions to analyze the at least one object; and program instructions to generate an object profile associated with the at least one object based on the analysis, wherein the object profile comprises historical information associated with the at least one object.

18. The computer system of claim 14, wherein the program instructions to predict the plurality of object metrics further comprise:

program instructions to utilize the optimal assistance model to calculate the degree of assistance associated with the at least one object required for the user.

19. The computer system of claim 18, wherein the program instructions to visualize the plurality of object metrics further comprise:

program instructions to overlay the degree of assistance and the plurality of object metrics within the virtual environment for presentation to the user within an augmented reality experience based on a detection aligning with a direction of the at least one object.

20. The computer system of claim 16, wherein the level of impact is based on one or more of environmental data, gravitational forces, friction forces, electromagnetic forces, electric forces, chemical forces, rotational forces, and biological data.

* * * * *